Sept. 26, 1950  S. GOLDEN ET AL  2,523,464
ELECTRIC THRUST GAUGE
Filed Sept. 17, 1945
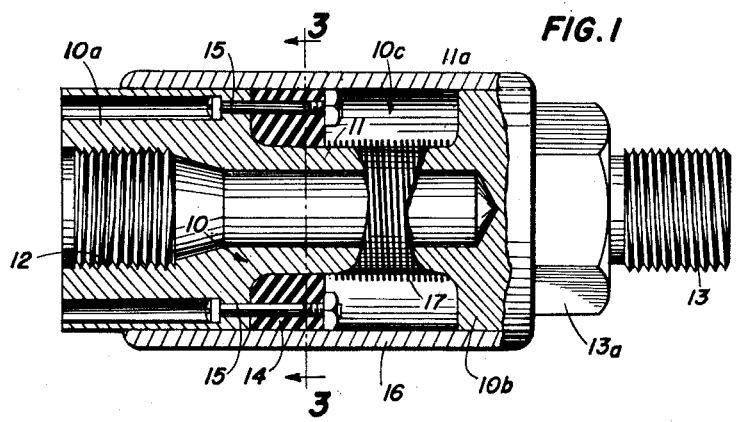
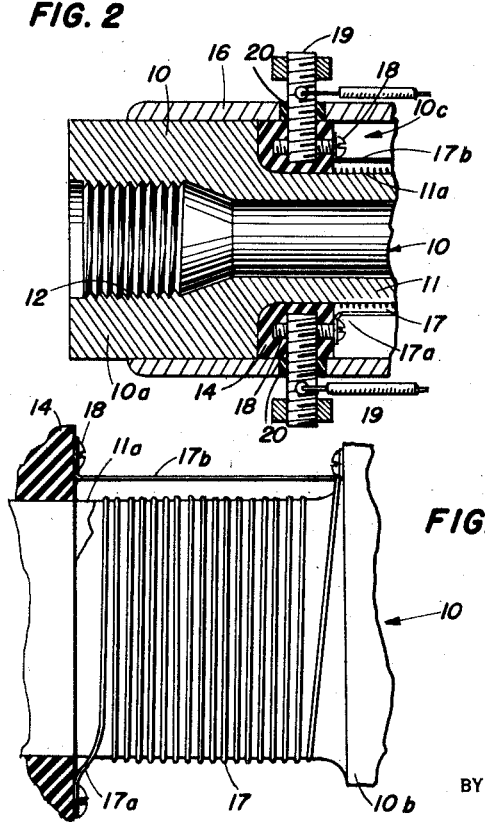
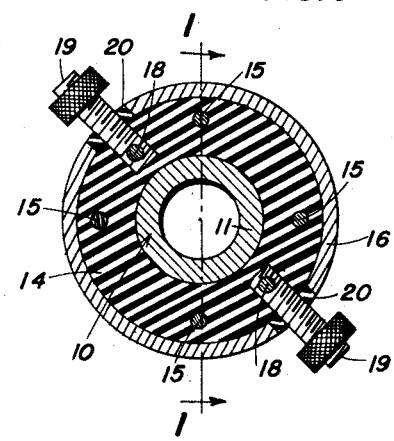
INVENTORS
SIDNEY GOLDEN
EUGENE A. COMLEY
NELSON E. ALEXANDER
BY
ATTORNEY Patented Sept. 26, 1950

2,523,464

UNITED STATES PATENT OFFICE 2,523,464

ELECTRIC THRUST GAUGE

Sidney Golden, Cumberland, Eugene A. Comley, Cresaptown, and Nelson E. Alexander, Cumberland, Md., assignors to the United States of America as represented by the Secretary of the Navy Application September 17, 1945, Serial No. 616,915

1 Claim. (Cl. 201—48)

This invention relates to thrust gages and more particularly to a novel device of this character for use in measuring an applied thrust or force or the instantaneous values thereof. The new thrust gage is especially suitable for use in determining the forward thrust of rocket type projectiles during static tests, although it is adaptable for other uses.

It is an object of this invention to provide an improved thrust gage for use in combination with recording equipment for determining thrust-time curves for thrusts of varying intensity and duration.

It is another object of this invention to provide a thrust gage for use in the measurement of high values of thrust or force and in which the force constant is so large that no oscillation on the usual record produced is discernible.

Another object of the invention is to provide a strain gage of the character described which is simple and compact in construction, has relatively few parts, and may be applied and used quickly and easily.

The specific nature of this invention as well as other objects and advantages thereof will be apparent from the following description of a preferred embodiment illustrated in the accompanying drawing, in which:

Fig. 1 is a longitudinal vertical sectional view of the assembled gage, taken on the line 1—1 in Fig. 3;

Fig. 2 is a longitudinal horizontal sectional view of a portion of the assembly shown in Fig. 1;

Fig. 3 is a cross sectional view on line 3—3 in Fig. 1, and

Fig. 4 is an enlarged elevation view of part of the body member of the improved gage, showing the winding of the resistance strain gage wire.

The thrust gage assembly, as shown, comprises a spool-like metal body 10 having enlarged end portions 10a and 10b connected by a central, reduced cylindrical portion 11. The end portion 10a is internally threaded, as shown at 12, and the end portion 10b has a central boss which is externally threaded, as shown at 13. Adjacent the inner end of the threaded portion 13, the body 10 has an hexagonal element 13a which may be integral with the end portion 10b. The element 13a is adapted to be received in a wrench (not shown) for a purpose to be described presently.

An insulating ring 14 is secured around one end of the cylindrical portion 11 by bolts 15. A sleeve 16 is fitted over the enlarged end portions 10a and 10b to enclose the annular space 10c surrounding the cylindrical portion 11. A resistance strain gage wire 17 is wound closely around the outer surface of the cylindrical portion 11 and may be cemented thereto, a thin insulating coating 11a being interposed between wire 17 and cylindrical portion 11. Leads 17a and 17b from the wire 17 are connected by screws 18 to studs 19 in the ring 14, the studs extending outward through insulated washers 20 in the sleeve 16. The studs or binding posts 19 are connected to an oscilloscope and recording equipment (not illustrated) which may be of any well-known type.

The thrust gage assembly may be mounted in apparatus of the type disclosed in a copending application of Clarence N. Hickman, Ser. No. 563,738, filed Nov. 16, 1944, now Patent #2,446,537 issued August 10, 1948 in which the thrust gage will have one end engaging a vertical base plate carried on a solid rigid support, and will have its other end in contact with the head of a horizontally supported rocket projectile, preferably through suitable interposed spacer blocks. In connecting the gage between the base plate and rocket projectile, a wrench may be applied to the hexagonal element 13a for screwing the externally threaded portion 13 to either the base plate or the rocket head. A connection from the other of these members may then be screwed into the internally threaded portion 12.

When a force or thrust is applied to one end of the cylindrical portion 11, as from the rocket projectile through the end portion 10a or 10b, the cylinder is compressed and distorted, resulting in a tensile strain on the wire 17 and corresponding change in its electrical resistance. The change in the electrical resistance may be measured and recorded by electronic apparatus, such as a balanced bridge circuit and oscilloscope, connected across the studs 19.

Since the gage of this invention operates on the compression principle, its maximum range is limited only by the elastic limit of the material from which it is made. It is therefore suited to the measurement of high values of thrust or force. Because of the extremely short movement of the cylinder 11, the force constant of the gage is so large that objectionable oscillation on the electronic record is substantially eliminated.

It will be apparent that the new gage is of simple, rugged and compact construction, may be easily assembled, and is adapted for quick and easy application and use. An important feature of the invention resides in winding the resistance strain gage wire 17 spirally on the cylindrical portion 11, as shown, whereby the turns of the wire are substantially at right angles to the axis of the spool-like body 10. Thus, when the body 10 is subjected to endwise compression, the cylindrical portion 11 is deformed and expanded radially, causing a tensile strain on the wire 17 which is approximately in direct proportion to the deformation and therefore the force of the compression. Another important feature of the invention is the insulation of the leads from the wire 17 by means of the insulating ring 14 mounted on cylindrical portion 11 and carrying the insulated studs 19, whereby short circuiting of the wire 17 is prevented. It will be understood that the wire 17 is of the type which changes its resistance when subjected to tensile strain, the resistance change being a predetermined function of strain. Thus, the changes in electrical resistance, as measured across the studs 19, may be translated into terms of changes in the compressive force on the body 10, and therefore the thrust of the rocket projectile or other device against the strain gage. Wire of the character described is well known in the art. For example, wire made of material such as "Constantan" or "Advance" may be used.

We claim:

In a thrust gage having a spool-like body adapted to be subjected to endwise compression, the combination of a strain-sensitive electrical resistance gage wire wound helically on said body with the turns of the wire disposed at substantially right angles to the longitudinal axis of said body whereby the radial deformation of said body when subjected to endwise compression will cause tensile strain of proportionate magnitude to be set up in said wire, an insulating ring mounted on the body adjacent one end of the wire, radial conducting studs projecting from said ring for connecting the gage across a resistance measuring device, electrical connections between the studs and the ends of the wire, respectively, and a sleeve fitted over the end portions of the body for housing said wire and ring and having a pair of diametrically disposed openings each containing an insulating washer for receiving said studs.

SIDNEY GOLDEN.
EUGENE A. COMLEY.
NELSON E. ALEXANDER.

REFERENCES CITED

The following references are of record in the file of this patent:

UNITED STATES PATENTS

| Number | Name | Date |
|---|---|---|
| 2,327,935 | Simmons | Aug. 24, 1943 |
| 2,391,966 | Harrison | Jan. 1, 1946 |